(12) United States Patent
Ellmauthaler et al.

(10) Patent No.: US 9,719,846 B2
(45) Date of Patent: Aug. 1, 2017

(54) MUD PULSE DETECTION USING DISTRIBUTED ACOUSTIC SENSING

(71) Applicant: Halliburton Energy Services, Inc., Houston, TX (US)

(72) Inventors: Andreas Ellmauthaler, Rio de Janeiro (BR); Leonardo de Oliveira Nunes, Rio de Janeiro (BR); Neal Gregory Skinner, Lewisville, TX (US); Christopher Lee Stokely, Houston, TX (US); David Andrew Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/122,607

(22) PCT Filed: Aug. 14, 2015

(86) PCT No.: PCT/US2015/045295
§ 371 (c)(1),
(2) Date: Aug. 30, 2016

(87) PCT Pub. No.: WO2017/030534
PCT Pub. Date: Feb. 23, 2017

(65) Prior Publication Data
US 2017/0176243 A1    Jun. 22, 2017

(51) Int. Cl.
*G01H 9/00* (2006.01)
*E21B 47/18* (2012.01)

(52) U.S. Cl.
CPC ............. *G01H 9/004* (2013.01); *E21B 47/18* (2013.01)

(58) Field of Classification Search
CPC .................................. G01H 9/004; E21B 47/18
See application file for complete search history.

(56) References Cited

U.S. PATENT DOCUMENTS 4,872,146 A    10/1989    Farmer et al.
6,913,079 B2    7/2005    Tubel
(Continued)

OTHER PUBLICATIONS

Daley, Thomas M., et al. "Field testing of fiber-optic distributed acoustic sensing (DAS) for subsurface seismic monitoring." The Leading Edge 32.6 (2013): 699-706. Also found at http://www.mit.edu/~demiller/2013_Daley_et_al_TLE.pdf.
(Continued)

*Primary Examiner* — Sisay Yacob
(74) *Attorney, Agent, or Firm* — John W. Wustenberg; Baker Botts L.L.P.

(57) ABSTRACT

An example system for detecting mud pulses may include a distributed acoustic sensing (DAS) data collection system coupled to a downhole drilling system, and an information handling system communicably coupled to the DAS data collection system. The information handling system may include a processor and memory coupled to the processor. The memory may contain a set of instructions that, when executed by the processor, cause the processor to receive quadrature DAS data signals from the DAS data collection system, determine a first template signal associated with mud pulses, transform the determined first template signal into analytic representation form, perform a matched filter operation using the quadrature DAS data signals and the transformed first template signal, and analyze an output signal of the matched filter operation to detect mud pulses in the downhole drilling system.

20 Claims, 5 Drawing Sheets

(56) References Cited

U.S. PATENT DOCUMENTS

| | | | |
|---|---|---|---|
| 8,408,064 | B2 | 4/2013 | Hartog et al. |
| 9,429,466 | B2* | 8/2016 | Barfoot ................. G01H 9/004 |
| 2005/0034917 | A1 | 2/2005 | Mathiszik et al. |
| 2006/0098531 | A1 | 5/2006 | Gardner et al. |
| 2010/0107754 | A1 | 5/2010 | Hartog et al. |
| 2010/0200743 | A1 | 8/2010 | Forster et al. |
| 2011/0069302 | A1 | 3/2011 | Hill et al. |
| 2011/0280103 | A1 | 11/2011 | Bostick, III |
| 2012/0092960 | A1 | 4/2012 | Gaston et al. |
| 2012/0111104 | A1 | 5/2012 | Taverner et al. |
| 2012/0280117 | A1 | 11/2012 | Lewis et al. |
| 2012/0298421 | A1 | 11/2012 | Coates et al. |
| 2013/0091942 | A1 | 4/2013 | Samson et al. |
| 2013/0167628 | A1 | 7/2013 | Hull et al. |
| 2014/0025319 | A1 | 1/2014 | Farhadiroushan et al. |
| 2014/0097848 | A1 | 4/2014 | LeBlanc et al. |
| 2014/0180592 | A1 | 6/2014 | Ravi et al. |
| 2015/0014521 | A1 | 1/2015 | Barfoot |
| 2015/0114127 | A1* | 4/2015 | Barfoot ................. G01H 9/004 73/655 |

OTHER PUBLICATIONS

Williams, John. "Distributed acoustic sensing for pipeline monitoring." Pipeline Gas J 239.7 (2012). at http://www.pipelineandgasjournal.com/distributed-acoustic-sensing-pipeline-monitoring.

International Search Report and Written Opinion issued in related PCT Application No. PCT/US2015/045295 mailed Apr. 26, 2016, 9 pages.

* cited by examiner

MUD PULSE DETECTION USING DISTRIBUTED ACOUSTIC SENSING

CROSS-REFERENCE TO RELATED APPLICATION

The present application is a U.S. National Stage Application of International Application No. PCT/US2015/045295 filed Aug. 14, 2015, which is incorporated herein by reference in its entirety for all purposes.

BACKGROUND

This disclosure generally relates to the monitoring of hydrocarbon wellbores, and more particularly to detecting mud pulses using Distributed Acoustic Sensing (DAS) techniques.

Drilling is exceedingly more complex than merely boring a hole in the ground. Modern drilling relies on the acquisition of many disparate data streams, some of which may be obtained using mud pulse telemetry techniques. Highly engineered drilling fluid (known in the industry simply as "mud") must be constantly circulated downhole through the drill bit and the area surrounding the drill bit for cooling, lubrication, and removal of cuttings, and then pumped through a mud conditioning system to clean the drilling fluid or to perform other operations. That same mud may simultaneously serve as the signal propagation medium for communicating signals to the surface from thousands of feet below. With mud pulse telemetry, drilling systems may use valves to modulate the flow of the mud, which may generate pressure pulses that propagate up the column of fluid inside the wellbore. The pressure pulses may be referred to as mud pulses, and may be analyzed to determine one or more properties or characteristics associated with the drilling operation.

Acoustic sensing using DAS may use the Rayleigh backscatter property of a fiber's optical core and may spatially detect disturbances that are distributed along the fiber length. Such systems may rely on detecting optical phase changes brought about by changes in strain along the fiber's core. Externally-generated acoustic disturbances may create very small strain changes to optical fibers.

BRIEF DESCRIPTION OF THE DRAWINGS

These drawings illustrate certain aspects of certain embodiments of the present disclosure. They should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "fluidically coupled" as used herein is intended to mean that there is either a direct or an indirect fluid flow path between two components.

The present disclosure describes a system and method for detecting transmitted mud pulses using a DAS system. An example signal processing system and methodology described below may detect mud pulses within a recorded DAS data stream with high accuracy by performing a matched filter operation using the DAS data signals and associated template signals. In particular embodiments, this may include performing a matched filter operation on a quadrature representation of received DAS data signals using an analytic representation of a template signal which is chosen to closely match the received DAS data signals. By performing a matched filter operation using these two signals, the need to extract the phase information from the backscattered DAS data signal, which involves non-linear operations that tend to be very sensitive to imperfections of the optical and mechanical components, is successfully avoided.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 6, where like numbers are used to indicate like and corresponding parts.

Figure 1:
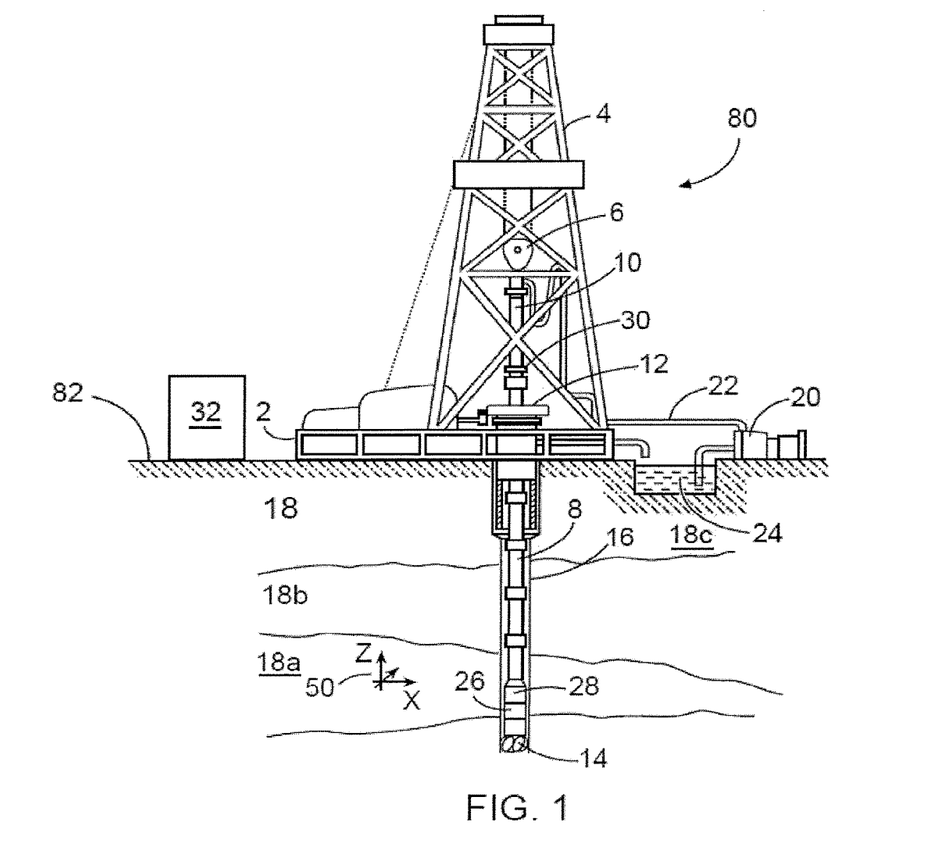
FIG. 1 illustrates an example drilling system, in accordance with embodiments of the present disclosure.

FIG. 1 is a diagram of an example subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD/MWD elements 26. As the bit extends the borehole 16 through the formations 18, the LWD/MWD elements 26 may collect measurements relating to borehole 16. The LWD/MWD elements 26 may be communicably coupled to a telemetry element 28. The telemetry element 28 may receive measurements from the LWD/MWD elements 26 and transmit telemetry data corresponding to the received measurements to the surface 82. The telemetry element 28 may comprise a mud pulser that receives measurements from the LWD/MWD elements 26 and transmits telemetry data corresponding to the measurement data to the surface 82 in the form of pressure signals within the circulating drilling fluid. The pressure signals may comprise pressure pulses that travel upwards within the drill string 8 and towards the pump 20 through the kelly 10 and pipe 22.

The pressure signals transmitted by the telemetry element 28 may be received by one or more pulse detectors positioned at the surface. As depicted, a pulse detector 30 is coupled below the kelly 10, although the pulse detectors may be positioned anywhere within the drilling system where they will be exposed to the pressure pulses. The pulse detector 30 may be communicably coupled to an information handling system 32 positioned at the surface, such as through a wired or wireless communications channel. The information handling system 32 may receive output signals from the pulse detector 30 that correspond to the pressure pulses and extrapolate the measurement data from the LWD/MWD tool 162 based, at least in part, on the output signals.

Modifications, additions, or omissions may be made to FIG. 1 without departing from the scope of the present disclosure. For example, FIG. 1 illustrates components of drilling system 100 in a particular configuration. However, any suitable configuration of drilling components for drilling a hydrocarbon well may be used.

Figure 2:
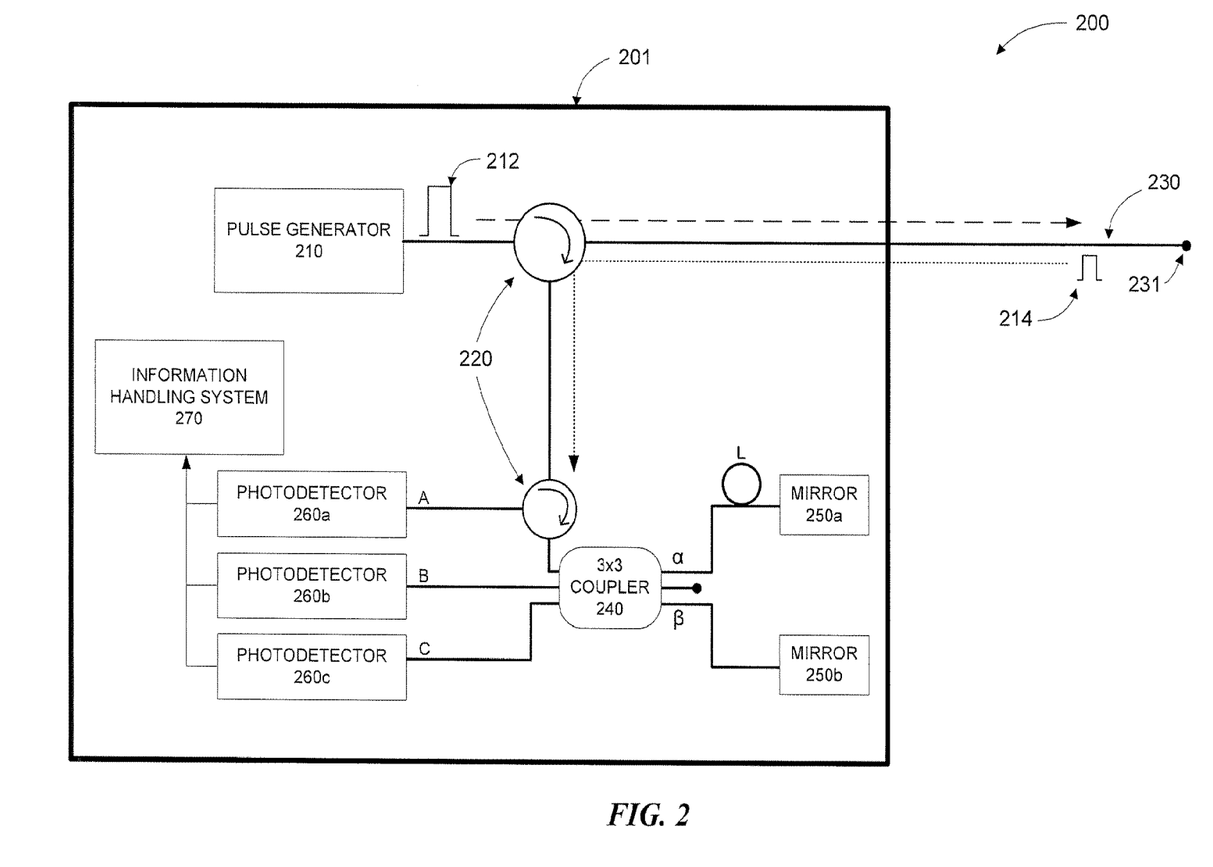
FIG. 2 illustrates an example DAS data collection system, in accordance with embodiments of the present disclosure.
Figures 3, 4:
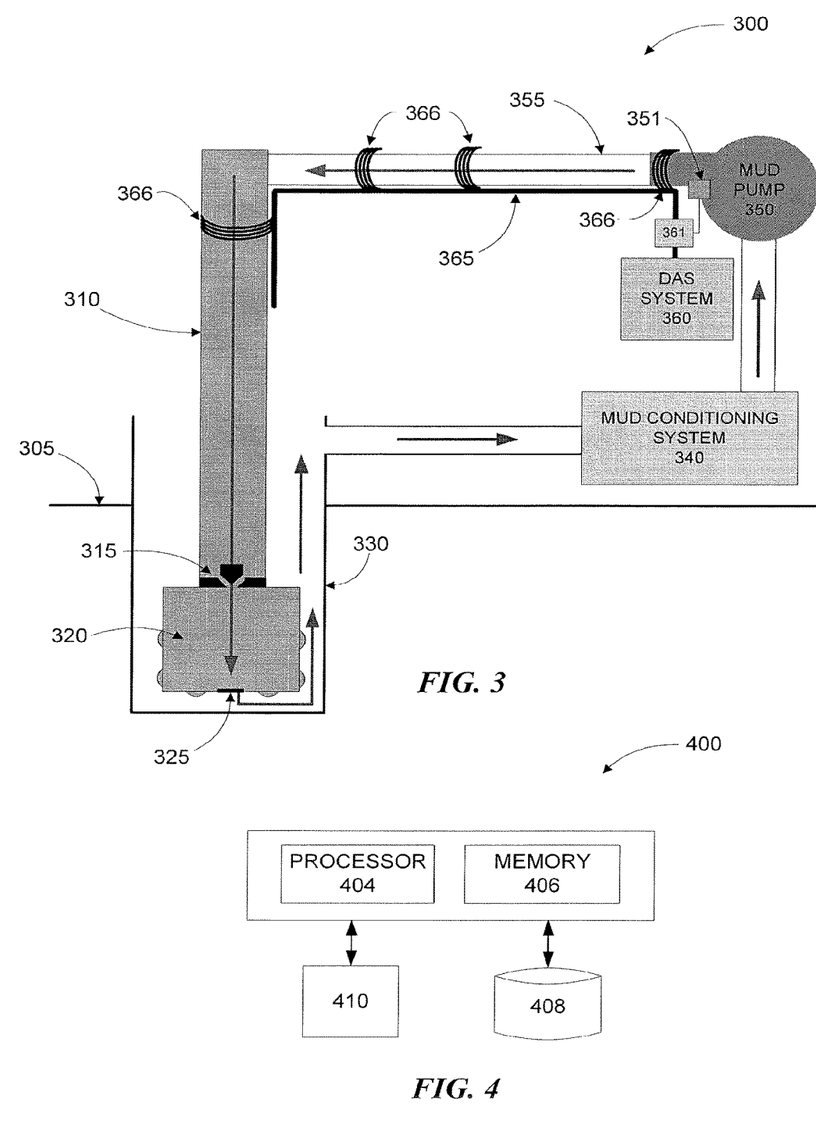
FIG. 3 illustrates an example mud pulse detection system for use in a downhole drilling system, in accordance with embodiments of the present disclosure.
FIG. 4 illustrates a block diagram of an exemplary information handling system for use with the drilling system, in accordance with embodiments of the present disclosure.

According to aspects of the present disclosure, the pulse detector 30 of the system 80 may comprise elements of a DAS data collection system. FIG. 2 illustrates an example DAS data collection system 200, in accordance with embodiments of the present disclosure. DAS data collection system 200 may be coupled to components of a drilling system similar to drilling system 80 and function as a pulse detector that detects mud pulses and/or mud pump stroke pulses in the drilling system. For example, DAS system 200 may be coupled to a mud pump, a mud return tube, or a drill string of a drilling system as illustrated in FIG. 3 and described further below.

DAS data collection system 200 comprises DAS box 201 coupled to sensing fiber 230. DAS box 201 may be a physical container that comprises optical components suitable for performing DAS techniques using optical signals 212 transmitted through sensing fiber 230, including signal generator 210, circulators 220, coupler 240, mirrors 250, photodetectors 260, and information handling system 270 (all of which are communicably coupled with optical fiber), while sensing fiber 230 may be any suitable optical fiber for performing DAS techniques. DAS box 201 and sensing fiber 230 may be located at any suitable location for detecting mud pulse telemetry data and/or mud pump stroke information. For example, in some embodiments, DAS box 201 may be located at the surface of the wellbore with sensing fiber 230 coupled to one or more components of the drilling system, such as a mud pump, a mud return tube, and a drill string.

Signal generator 210 may include a laser and associated opto-electronics for generating optical signals 212 that travel down sensing fiber 230. Signal generator 210 may be coupled one or more circulators 220 inside DAS box 201. In certain embodiments, optical signals 212 from signal generator 210 may be amplified using optical gain elements, such as any suitable amplification mechanisms including, but not limited to, Erbium Doped Fiber Amplifiers (EDFAs) or Semiconductor Optical Amplifiers (SOAs). Optical signals 212 may be highly coherent, narrow spectral line width interrogation light signals in particular embodiments.

As optical signals 212 travel down sensing fiber 230 as illustrated in FIG. 2, imperfections in the sensing fiber 230 may cause portions of the light to be backscattered along the sensing fiber 230 due to Rayleigh scattering. Scattered light according to Rayleigh scattering is returned from every point along the sensing fiber 230 along the length of the sensing fiber 230 and is shown as backscattered light 214 in FIG. 2. This backscatter effect may be referred to as Rayleigh backscatter. Density fluctuations in the sensing fiber 230 may give rise to energy loss due to the scattered light, with the following coefficient:

$$\alpha_{scat} = \frac{8\pi^3}{3\lambda^4} n^8 p^2 k T_f \beta$$

where n is the refraction index, p is the photoelastic coefficient of the sensing fiber 230, k is the Boltzmann constant, and β is the isothermal compressibility. $T_f$ is a fictive temperature, representing the temperature at which the density fluctuations are "frozen" in the material. In certain embodiments, sensing fiber 230 may be terminated with low reflection device 231. In some embodiments, the low reflection device may be a fiber coiled and tightly bent such that all the remaining energy leaks out of the fiber due to macrobending. In other embodiments, low reflection device 231 may be an angle cleaved fiber. In still other embodiments, the low reflection device 231 may be a coreless optical fiber. In still other embodiments, low reflection device 231 may be a termination, such as an AFL END-LIGHT. In still other embodiments, sensing fiber 230 may be terminated in an index matching gel or liquid.

Backscattered light 214 may consist of an optical light wave or waves with a phase that is altered by changes to the optical path length at some location or locations along sensing fiber 230 caused by vibration or acoustically induced strain. When used as a pulse detector, these vibrations or acoustically induced strains may comprise mud pulses transmitted by a telemetry system. By sensing the phase of the backscattered light signals, it is possible to quantify the vibration or acoustics along sensing fiber 230. An example method of detecting the phase the backscattered light is through the use of a 3×3 coupler, as illustrated in FIG. 2 as coupler 240. Backscattered light 214 travels through circulator 220 toward coupler 240, which may split backscattered light 214 among at least two paths (i.e., paths α and β in FIG. 2). One of the two paths may comprise an additional length L beyond the length of the other path. The split backscattered light 214 may travel down each of the two paths, and then be reflected by mirrors 250. Mirrors 250 may include any suitable optical reflection device, such as a Faraday rotator mirror. The reflected light from mirrors 250 may then be combined in coupler 240 and passed toward photodetectors 260a-c. The backscattered light signal at each of photodetectors 260a-c will contain the interfered light signals from the two paths (α and β), with each signal having a relative phase shift of 120 degrees from the others.

The signals at photodetectors 260a-c may be passed to information handling system 270 for analysis. Information handling system 270 may be located at any suitable location, and may be located downhole, uphole (e.g., at information handling system 32 of FIG. 1), or in a combination thereof. In particular embodiments, information handling system 270 may measure the interfered signals at photodetectors 260a-c having three different relative phase shifts of 0, +120, and −120 degrees, and accordingly determine the phase difference between the backscattered light signals along the two paths. This phase difference determined by information handling system 270 may be used to measure strain on sensing fiber 230 caused by vibrations in a formation. By sampling the signals at photodetectors 260a-c at a high sample rate, various regions along sensing fiber 230 may be sampled, with each region being the length of the path mismatch L between paths α and β.

The below equations may define the light signal received by photodetectors 260a-c:

$$a = k + P_\alpha \cos(2\pi ft) + P_\beta \cos(2\pi ft + \phi)$$

$$b = k + P_\alpha \cos(2\pi ft) + P_\beta \cos\left(2\pi ft + \phi + \frac{2\pi}{3}\right)$$

-continued $$c = k + P_\alpha \cos(2\pi ft) + P_\beta \cos\left(2\pi ft + \phi - \frac{2\pi}{3}\right)$$

where a represents the signal at photodetector 260a, b represents the signal at photodetector 260b, c represents the signal at photodetector 260c, f represents the optical frequency of the light signal, φ=optical phase difference between the two light signals from the two arms of the interferometer, $P_\alpha$ and $P_\beta$ represent the optical power of the light signals along paths α and β, respectively, and k represents the optical power of non-interfering light signals received at the photodetectors (which may include noise from an amplifier and light with mismatched polarization which will not produce an interference signal).

In embodiments where photodetectors 260a-c are square law detectors with a bandwidth much lower than the optical frequency (e.g., less than 1 GHz), the signal obtained from the photodetectors may be approximated by the below equations:

$$A = \tfrac{1}{2}(2k^2 + P_\alpha^2 + 2P_\alpha P_\beta \cos(\phi) + P_\beta^2)$$

$$B = \tfrac{1}{2}(2k^2 + P_\alpha^2 + P_\beta^2 - P_\alpha P_\beta(\cos(\phi) + \sqrt{3}\sin(\phi)))$$

$$C = \tfrac{1}{2}(2k^2 + P_\alpha^2 + P_\beta^2 + P_\alpha P_\beta(-\cos(\phi) + \sqrt{3}\sin(\phi)))$$

where A represents the approximated signal at photodetector 260a, B represents the approximated signal at photodetector 260b, and C represents the approximated signal at photodetector 260c. It will be understood by those of skill in the art that the terms in the above equations that contain φ are the terms that provide relevant information about the optical phase difference since the remaining terms involving the power (k, $P_\alpha$, and $P_\beta$) do not change as the optical phase changes.

In particular embodiments, quadrature processing may be used to determine the phase shift between the two signals. A quadrature signal may refer to a two-dimensional signal whose value at some instant in time can be specified by a single complex number having two parts: a real (or in-phase) part and an imaginary (or quadrature) part. Quadrature processing may refer to the use of the quadrature detected signals at photodetectors 260a-c. For example, a phase modulated signal y(t) with amplitude A, modulating phase signal θ(t), and constant carrier frequency f may be represented as:

$$y(t) = A \sin(2\pi ft + \theta(t))$$

or $$y(t) = I(t)\sin(2\pi ft) + Q(t)\cos(2\pi ft)$$

where $$I(t) = A \cos(\theta(t))$$

$$Q(t) = A \sin(\theta(t))$$

Mixing the signal y(t) with a signal at the carrier frequency f results in a modulated signal at the baseband frequency and at 2f, wherein the baseband signal may be represented as follows:

$$y(t)e^{i\theta(t)} = I(t) + i*Q(t)$$

Because the Q term is shifted by 90 degrees from the I term above, the Hilbert transform may be performed on the I term to get the Q term. Thus, where $\mathcal{H}(\bullet)$ represents the Hilbert transform:

$$Q(t) = (\mathcal{H}(I(t)))$$

The amplitude and phase of the signal may be represented by the following equations:

$$|y(t)| = \sqrt{I(t)^2 + Q(t)^2}$$

$$\theta(t) = \arctan\left(\frac{Q(t)}{I(t)}\right)$$

It will be understood by those of skill in the art that for signals A, B, and C above, the corresponding quadrature I and Q terms may be represented by the following equations:

$$I = A + B - 2C = \frac{3}{2}P_\alpha P_\beta(\cos(\phi) - \sqrt{3}\sin(\phi)) = 3P_\alpha P_\beta \cos\left(\phi + \frac{\pi}{3}\right)$$

$$Q = \sqrt{3}(A - B) = \frac{3}{2}P_\alpha P_\beta(\sqrt{3}\cos(\phi) + \sin(\phi)) = 3P_\alpha P_\beta \sin\left(\phi + \frac{\pi}{3}\right)$$

wherein the phase shift, which is shifted by $\pi/3$, is represented by:

$$\phi = \arctan\left(\frac{Q}{I}\right) - \frac{\pi}{3}$$

Accordingly, the phase of the backscattered light in sensing fiber 230 may be determined using the quadrature representations of the DAS data signals received at photodetectors 260.

Modifications, additions, or omissions may be made to FIG. 2 without departing from the scope of the present disclosure. For example, FIG. 2 shows a particular configuration of components of system 200. However, any suitable configuration of components configured to detect the optical phase and/or amplitude of coherent Rayleigh backscatter in optical fiber using spatial multiplexing (i.e., monitoring different locations, or channels, along the length of the fiber) may be used. For example, although optical signals 212 are illustrated as pulses, DAS data collection system 200 may transmit continuous wave optical signals 212 down sensing fiber 230 instead of, or in addition to, optical pulses. As another example, the measurement of acoustic disturbances in the optical fiber may be accomplished using fiber Bragg gratings embedded in the optical fiber. As yet another example, an interferometer may be placed in the launch path (i.e. in a position that splits and interferes optical signals 212 prior to traveling down sensing fiber 230) of the interrogating signal (i.e., the transmitted optical signal 212) to generate a pair of signals that travel down sensing fiber 230, as opposed to the use of an interferometer further downstream as shown in FIG. 2.

FIG. 3 illustrates an example mud pulse detection system 300 for use in a downhole drilling system, in accordance with embodiments of the present disclosure. The system 300 may be incorporated into a drilling system similar to the one described with reference to FIG. 1, for instance. As depicted, system 300 includes a drill string 310 coupled to drill bit 320 located below surface 305 inside wellbore 330. During drilling operations, drilling fluid known as "mud" may be pumped down drill string 310 and through valve 315 toward drill bit 320, as shown in FIG. 3. Drill string 310 may comprise a valve 315 through which mud may flow toward drill bit 320. The mud may flow out of orifices 325 in drill bit 320 in order to provide lubrication and cooling for drill bit 320 as it cuts into the formation and to draw cuttings away from the bit-formation interface toward the surface. The mud may then be drawn out of wellbore 330 toward mud conditioning system 340, which may clean cuttings or other debris away from the mud and store the clean mud prior to being pumped back into drill string 310 by mud pump 350 for re-use as just described.

In particular embodiments, DAS system 360 and sensing fiber 365 (which may be similar to DAS box 201 and sensing fiber 230 of FIG. 2, respectively) may be used to detect and/or analyze mud pulses and/or mud pump stroke information in system 300. During drilling and while the mud flows through the system as described above, valve 315 may actuate (i.e., close or open, depending on the mud pulse telemetry configuration used (e.g., positive pulse vs. negative pulse)), generating pressure pulses that travel up drill string 310. The pressure pulses are positive changes in pressure for positive pulse embodiments, while the pressure pulses are negative changes in pressure for negative pulse embodiments. These pressure pulses (referred to as mud pulses) may be detected using DAS techniques as described herein. To detect the mud pulses, sensing fiber 365 may be coupled to one or more components of system 300 (such as mud pump 350, return tube 355, and/or drill string 310 as shown in FIG. 3), allowing DAS system 360 to detect the acoustic disturbances in sensing fiber 365 caused by the mud pulses in the manner described above with respect to FIG. 2. The detected mud pulses may then be analyzed as described further below with respect to FIGS. 5-6.

In particular embodiments, system 300 may include sensing areas 366. Sensing areas 366 may include portions of sensing fiber 365 wrapped around a portion of system 300 (e.g., return tube 355 or drill string 310) many times. For example, in embodiments where DAS channels are approximately one (1) meter apart, 100 meters of sensing fiber 365 may be wrapped around a portion of return tube 355 to form a sensing area 366 that spans a few inches of return tube 355. Sensing areas 366 may accordingly comprise multiple channels of DAS data over a relatively close physical area of system 300, enhancing the signal-to-noise ratio (SNR) of the detected DAS data signals in sensing area 366. The enhanced SNR may be due to enhanced signals in the DAS data signal from acoustic disturbances being detected in multiple locations (channels) of sensing fiber 365. In addition, sensing areas 366 may allow for the averaging of the signals from each of the channels in the sensing area 366, improving the quality of the detected DAS data signal (i.e., SNR is increased by $\sqrt{N}$ where there are N channels in sensing area 366), since noise present in only a few of the channels of sensing area 366 will be reduced by the relatively noiseless channels in the sensing area 366 detecting the same acoustic disturbances in the same area of system 300.

In certain embodiments, sensing areas 366 may be used at multiple locations of system 300, as shown. Sensing fiber 365 may bend when wrapped to create sensing areas 366, causing reflections from the bend points. These reflections may have considerably higher magnitude than Rayleigh scattering from the same area. The reflections may thus destructively interfere with signals travelling in sensing fiber 365, resulting in null channels in the DAS data (i.e., channels with no data signal). Because the areas where bends occur in fiber 365 may change during operation (e.g., through physical movement of the components of system 300 during operation), the locations of the null channels may change during operation. Having multiple sensing areas 366 along the path of mud flow in system 300 may therefore allow for constant mud pulse sensing during operation.

In addition, in certain embodiments, DAS system 360 and sensing fiber 365 may be used to detect and/or analyze stroke pulses from mud pump 350. During drilling, mud pump 350 may generate additional pressure pulses in system 300 (referred to as stroke pulses or mud pump stroke information) when pumping mud back to drill string 310 through return tube 355. These stroke pulses may be caused, for example, by pistons or valves in mud pump 350. In particular embodiments, the stroke pulses may be detected by DAS system 360 through the use of a stroke sensor 351 coupled to mud pump 350 and a fiber disturber 361 coupled to sensing fiber 365. Fiber disturbers 361 may be any suitable means for encoding stroke pulse information into DAS data signals by causing acoustic or vibrational disturbances in sensing fiber 365 based on information sent by stroke sensor 351. For example, stroke sensor 351 may send information associated with detected stroke pulses to a piezo-electric fiber stretcher in fiber disturber 361. In certain embodiments, the mud pump stroke pulses may be detected by a sensing area 366 on or near mud pump 350. For example, sensing fiber 365 may be wrapped around one or more portions of mud pump 350 as shown in FIG. 3.

Furthermore, in certain embodiments, DAS system 360 and sensing fiber 365 may be used to analyze mud flow rates through tube 355. By analyzing multiple channels or sensing areas in DAS system 360, the travel time of the mud pulses may be estimated using a matched filter operation (which may include cross-correlation operations), as described further below with respect to FIGS. 5-6. Because the distance between the DAS two channels or sensing areas is known, a mud pulse velocity (and thus mud flow velocity) may be readily determined using the determined travel time of the mud pulses.

Modifications, additions, or omissions may be made to FIG. 3 without departing from the scope of the present disclosure. For example, FIG. 3 illustrates components of drilling system 300 in a particular configuration. However, any suitable configuration of drilling components for detecting mud pulses using DAS techniques may be used.

FIG. 4 illustrates a block diagram of an exemplary information handling system 400 that may be used, for instance, with the drilling system 80 of FIG. 1, DAS data collection system 200 of FIG. 2, or mud pulse detection system 300 of FIG. 3 in accordance with embodiments of the present disclosure. Information handling system 400 or components thereof can be located at the surface (e.g., in information handling system 32 of FIG. 1), downhole (e.g., in BHA 106 and/or in LWD/MWD apparatus 107 of FIG. 1), or some combination of both locations (e.g., certain components may be disposed at the surface while certain other components may be disposed downhole, with the surface components being communicatively coupled to the downhole components).

Information handling system 400 may be configured to detect mud pulses in a downhole drilling system, in accordance with the teachings of the present disclosure. For example, information handling system 400 may be configured to perform matched filter operations using the received quadrature DAS data signals and analytic representations of determined template signals. Information handling system 400 may be used to perform the steps of the methods described below with respect to FIGS. 5-6. In addition, in some embodiments, information handling system 400 may be configured to detect mud flow rates in the downhole drilling system.

As depicted, information handling system 400 may include processor 404. Processor 404 may include, for example a microprocessor, microcontroller, digital signal processor (DSP), application specific integrated circuit (ASIC), or any other digital or analog circuitry configured to interpret and/or execute program instructions and/or process data. In some embodiments, processor 404 may be communicatively coupled to memory 406. Processor 404 may be configured to interpret and/or execute program instructions or other data retrieved and stored in memory 406. Program instructions or other data may constitute portions of software 408 for carrying out one or more methods described herein. Memory 406 may include any system, device, or apparatus configured to hold and/or house one or more memory modules; for example, memory 406 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from software 408 may be retrieved and stored in memory 406 for execution by processor 404.

In particular embodiments, information handling system 400 may be communicatively coupled to one or more displays 410 such that information processed by information handling system 400 may be conveyed to operators of drilling equipment. For example, information handling system 400 may convey information related to the detection of mud pulses (e.g., timing between the detected mud pulses) to display 410.

Modifications, additions, or omissions may be made to FIG. 4 without departing from the scope of the present disclosure. For example, FIG. 4 shows a particular configuration of components of information handling system 400. However, any suitable configurations of components may be used. For example, components of information handling system 400 may be implemented either as physical or logical components. Furthermore, in some embodiments, functionality associated with components of information handling system 400 may be implemented in special purpose circuits or components. In other embodiments, functionality associated with components of information handling system 400 may be implemented in configurable general purpose circuit or components. For example, components of information handling system 400 may be implemented by configured computer program instructions.

Figure 5A:
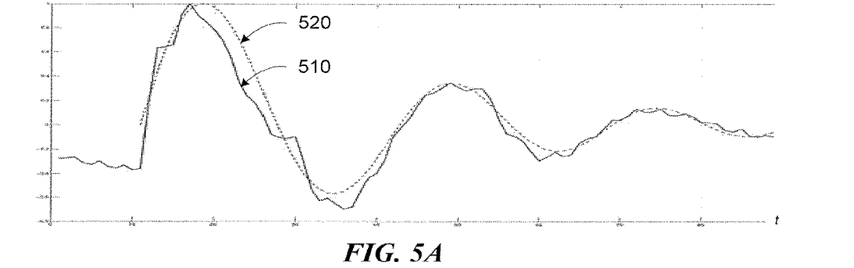
FIGS. 5A-5C illustrate example waveforms associated with mud pulse detection using DAS data collection techniques, in accordance with embodiments of the present disclosure.
Figure 5B:
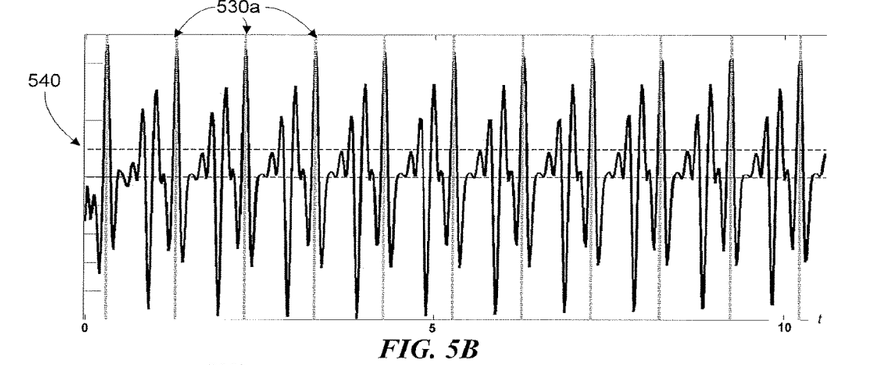
Figure 5C:
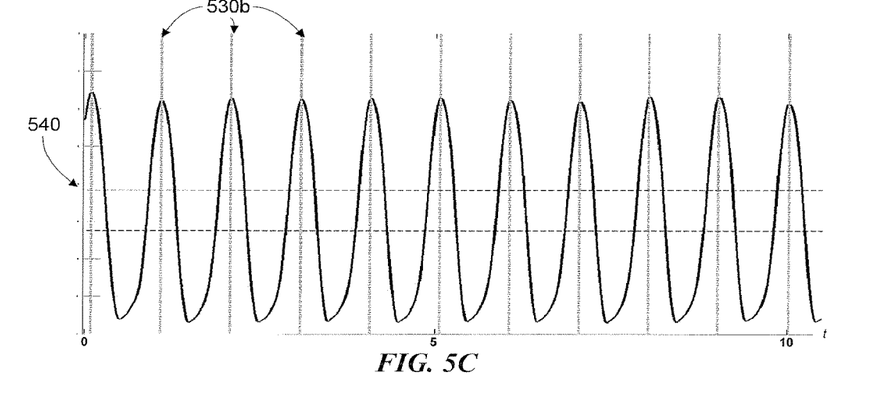

FIGS. 5A-5C illustrate example waveforms associated with mud pulse detection using DAS data collection techniques, in accordance with embodiments of the present disclosure. Mud pulses embedded within DAS data signals may contain a high amount of noise, such as noise caused by mud flow, pump noise or pressure pulses, formation vibrations, or the like, making the desired signal difficult to recover from the data. A method for performing signal analysis on such noisy data may include performing a matched filter operation. Matched filter operations may compensate for a non-flat noise floor unlike other methods, and may therefore provide a good recovery method for obtaining the desired mud pulse telemetry signals from the noisy DAS data. In one example matched filter approach, a template signal may be created to resemble the signal that is desired to be detected in the data. The template signal then my be cross-correlated with the received noisy data signal in order to recover the desired signal from the noisy data signal, or to determine when the signal is present within the data signal.

In mud pulse telemetry, for instance, the desired signal includes the signals generated by the mud pulses and detected using the DAS data collection system (e.g., DAS system 360 of FIG. 3). An example time-domain mud pulse signal 510 and associated time-domain template signal 520 are shown in FIG. 5A. In certain embodiments, mud pulse signals may be approximated using an attenuated sinusoidal template signal, parameterized by the following expression:

$$x(t) = E_0 e^{-\alpha(t)} \sin(\omega \beta(t) - \theta)$$

where $\alpha(t)$ specifies the amplitude attenuation of the sine wave and $\beta(t)$ models the change in frequency with time.

Performing a matched filter operation using the template signal and the received DAS data may provide a new "clean" signal for analysis. The output of the matched filter operation may be high whenever a signal similar to the template signal (e.g., a mud pulse) is present in the received data, and low where such a signal is not present in the received data. Conventional matched filter operations may be performed using the time-domain, phase data signal representations of the template and DAS data signals. One issue with this conventional approach, however, is that it may be very sensitive to phase discrepancies between the template signal and the received DAS data signal (e.g., the mismatches between signals 510 and 520 of FIG. 5A). These sensitivities may incorrectly suggest a time offset in the detected mud pulse signals if the phase is incorrectly estimated in the template signal used for the matched filter operation. FIG. 5B illustrates an example output of a matched filter operation using the phase data representation of received DAS data signals and template signal 520 of FIG. 5A, wherein mud pulse signals 510 are repeated every second.

Embodiments of the present disclosure may avoid or reduce the sensitivity to phase discrepancies by using quadrature DAS data signals (as described above) and analytic representations of the determined template signals. Using an analytic representation of a template mud pulse signal and the quadrature signals from the DAS data collection system may allow for mud pulse localizations to be determined by applying simple thresholds to the output produced by the matched filter operation. FIG. 5C illustrates an example output of a matched filter operation using the received quadrature DAS signals and the analytic representation of template signal 520, which may, but is not required to, take to following form:

$$x_{analytical}(t) = x(t) + i \cdot \mathcal{H}(x(t))$$

where $\mathcal{H}(\bullet)$ is the Hilbert transform and i is the imaginary unit ($\sqrt{-1}$). Those of ordinary skill in the art will understand that the analytic signal representation above resembles the complex sum of the I and Q components used in DAS data collection (and described above with respect to FIG. 2) to determine acoustic phase information from the backscattered optical signal, wherein the I component of the above equation comprises $x(t)$ and the Q component comprises $\mathcal{H}(x(t))$. By using the I and Q quadrature signals inherent to the DAS data collection system described above with respect to FIG. 2, a matched filter operation may be performed using analytic representations of template signals to detect mud pulses with high robustness and precision.

Peaks 530 in the outputs illustrated in FIG. 5B-5C correspond with detected mud pulses in the received DAS data. Those of ordinary skill in the art will recognize that peaks 530 in the outputs of FIGS. 5B-5C should occur every second, since the mud pulses occur every second in the received DAS data. However, due to slight phase mismatches in the received mud pulse signals 510 and the template signals 520 used in the matched filter operations that produced the outputs of FIGS. 5B-5C, peaks 530 may be slightly shifted or distorted from when they occur. It will be understood that using the phase data signals as inputs to the matched filter operation may cause more distortion than when the associated analytic signal representations are used as inputs to the matched filter operation, as is seen when comparing peaks 530a of FIG. 5B to peaks 530b of FIG. 5C (each of which should occur at every second on the x-axis for a perfectly matched template signal). In addition, it will be understood that the aforementioned time distortion may also cause amplitude distortion, wherein the output signal appears to contain less defined peaks 530. This may also be seen when comparing the output of FIG. 5B to the output of FIG. 5C. This amplitude distortion may cause difficulties when applying threshold filters such as thresholds 540 to the output to identify mud pulses in the DAS data signal (i.e., where peaks 530 occur). Comparing the use of threshold 540 in the output of FIG. 5B to the output of FIG. 5C, it will be seen that threshold 540 may cause false positive identifications of peaks in the output of FIG. 5B whereas threshold 540 may not cause the same false positive identifications in the output of FIG. 5C.

Accordingly, by performing matched filter operations using the quadrature signals of the received DAS data and analytic representations of determined template signals, unwanted effects such as those seen between FIGS. 5B and 5C may be avoided. This is because the matching of the template signal with the DAS data signal may be decoupled from the phase difference between the two signals (which requires non-linear arctan operations to determine, as described above), offering a more accurate representation of when mud pulses exist within the received DAS data.

In particular embodiments, the parameters $\alpha(t)$ and $\beta(t)$ for the template signal (described above) may be determined through one or more processes to match the shape of the template signal with detected mud pulse signals. In certain embodiments, this may be accomplished by an iterative estimation. For example, the best template signal fit in terms of $\alpha(t)$ (decay over time) and $\beta(t)$ (frequency change over time) may be calculated by means of an iterative optimization technique such as Gauss-Newton and Levenberg-Marquardt. Such optimization techniques may begin with a carefully chosen initial estimate for $\alpha(t)$ and $\beta(t)$ and iteratively improve this estimate thereafter by analyzing an appropriate cost function (e.g. Euclidean distance between estimated template signal in terms of $\alpha(t)$ and $\beta(t)$, and mud pulse signal obtained by means of a known training sequence). The optimization terminates after the estimated solution for $\alpha(t)$ and $\beta(t)$ results in a template signal which resembles the actual mud pulse signals in a sufficiently accurate manner. As another example, the best template signal fit in terms of $\alpha(t)$ and $\beta(t)$ may be calculated using a dictionary approach, wherein a database of template signals is maintained and used to match with mud pulse signals. Such methods may avoid potentially computationally-expensive optimization algorithms over a set of possible solutions that may be required by iterative estimation methods. An example dictionary method in this respect is the "Matching Pursuit" method and variations thereof. In yet other embodiments, determining terms of $\alpha(t)$ and $\beta(t)$ may be performed manually by an operator, such as by means of a look-up table.

In particular embodiments, the threshold for detecting mud pulses may be incorporated into the methodologies for template signal determination described above. For example, when using a training sequence with known mud pulse frequency, one might adjust the threshold such that the number of false-positive and false-negative mud pulse detections is zero. In other embodiments, the threshold may be determined manually by the operator using a look-up table containing the best threshold values for different transmission environments. In certain embodiments, a maximum function may be used to determine when peaks occur in the output of the matched filter operation.

Furthermore, in particular embodiments, mud pulse travel time may be determined by applying the matched filter operations to a plurality of DAS data channels. For example, cross-correlating the output of the matched filter operations for two or more DAS data channels may produce a result that indicates the relative delay or time-difference of arrival (TDoA) between the signal sensed in one DAS data channel and the other DAS data channel. Because the distance between the two DAS data channels is known, the pulse velocity may also be determined. The TDoA estimation may be accomplished, for example, through a simple cross-correlation or more involved techniques such as the generalized cross-correlation or subband estimators. In some embodiments, an interpolation step may also be used to improve on the precision of the TDoA estimation, leading to more precise velocity estimates. In addition, since the TDoA estimation can be applied for every possible pair of DAS data channels, the velocity estimation may be refined in some embodiments by combining different TDoA determinations from different DAS data channel pairs.

Modifications, additions, or omissions may be made to FIGS. 5A-5C without departing from the scope of the present disclosure. For example, FIG. 5A illustrates one example template signal. However, any suitable template signal for use in a matched filter operation for detecting mud pulse signals in received DAS data may be used.

Figure 6:
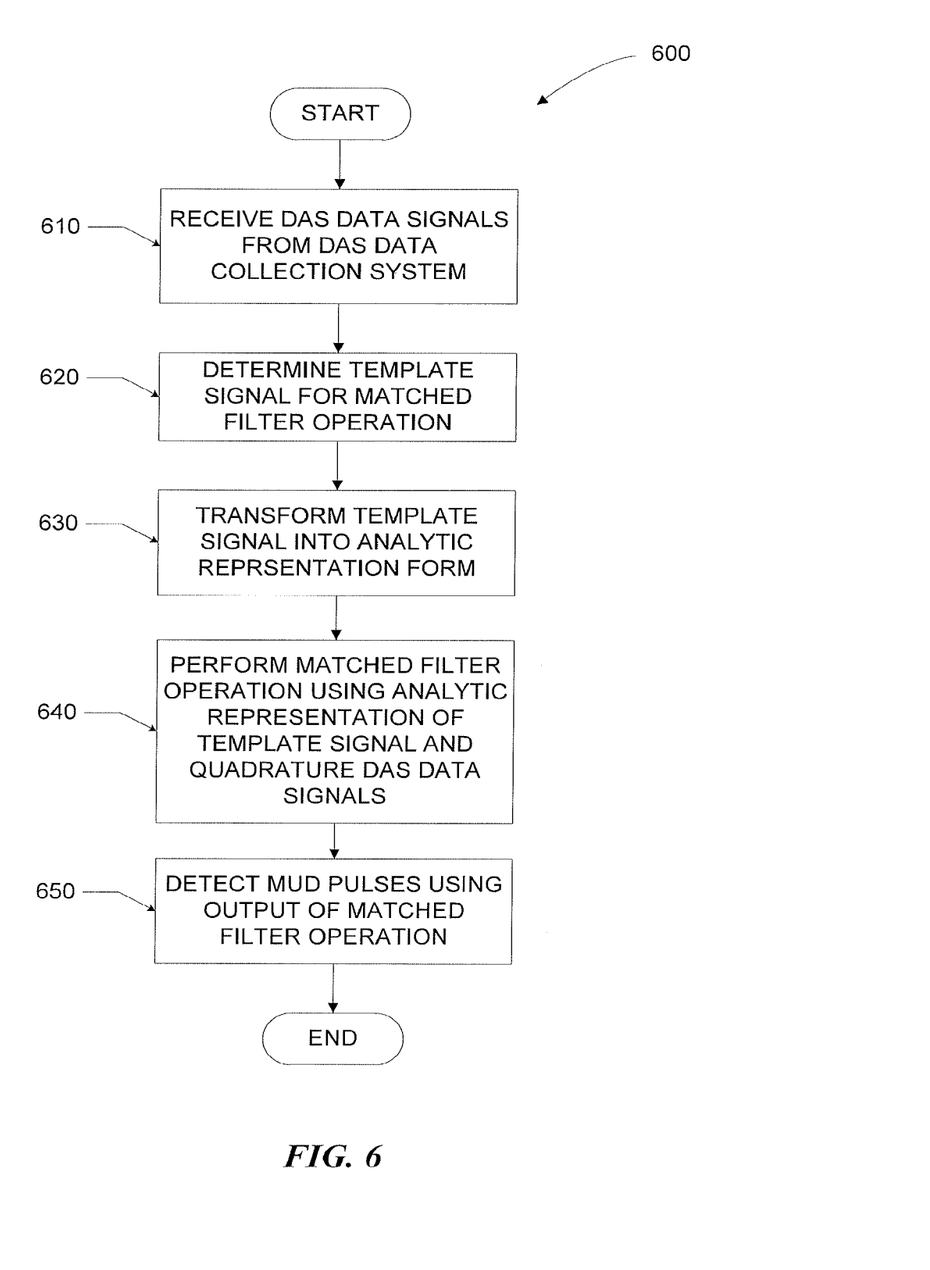
FIG. 6 illustrates an example method 600 for detecting mud pulses using DAS techniques in a downhole drilling system, in accordance with embodiments of the present disclosure.

FIG. 6 illustrates an example method 600 for detecting mud pulses using DAS techniques in a downhole drilling system, in accordance with embodiments of the present disclosure. Method 600 may be performed using one or more information handling systems, such as information handling system 400 of FIG. 4, located in one or more components of a drilling system, such as drilling system 100 of FIG. 1. For example, method 600 may be performed by information handling system 32 of FIG. 1, information handling system 270 of FIG. 2, DAS system 360 of FIG. 3, or any combination thereof.

Method 600 begins at step 610, where DAS data signals are received. The DAS data signal may be received from a DAS data collection system (similar to system 200 of FIG. 2) coupled to a portion of a downhole drilling system (as described above with respect to FIG. 3). For example, fiber optic cable coupled to DAS data collection system may be coupled to a mud pump, to a mud return tube connected thereto, and/or to the drill string of the downhole drilling system. The received DAS data signals may be in quadrature form, as described above.

At step 620, a template signal is determined for use in a matched filter operation with the received DAS data signals. The template signal may be determined such that it is substantially similar to mud pulses in mud pulse telemetry data. In some embodiments, the template signal may be a decaying sinusoidal signal as illustrated in FIG. 5A and described above. The template signal may be determined using an iterative estimation in certain embodiments. For example, a known training sequence may be used to determine the amount of decay of the signal over time as well as the amount of frequency change over time. In other embodiments, the template signal may be determined using by calculating and selecting the best fit signal from a database of template signals. At step 630, the determined template signal is transformed into its analytic representation. This may done by means of the Hilbert transform, as described above.

At step 640, a matched filter operation is performed using the analytic representation of the determined template signal and the quadrature signals of the received DAS data. In particular embodiments, the matched filter operation may include cross-correlation operations. At step 650, mud pulses are detected using an output of the matched filter operation. This may be done, in certain embodiments, by applying a threshold filter to the output of the matched filter operation. For example, as illustrated in FIG. 5C, a threshold may be used to determine when the output of the matched filter operation is above a certain level. Mud pulses may thus be detected in such embodiments during the time period when the matched filter output is above the threshold. In other embodiments, a maximum function (e.g., determining where the derivative of the output equals zero) may be applied to the output of the matched filter operation to detect mud pulses when maximums occur in the output of the matched filter operation (e.g., peaks 530b in FIG. 5C).

Modifications, additions, or omissions may be made to method 600 without departing from the scope of the present disclosure. For example, the order of the steps may be performed in a different manner than that described and some steps may be performed at the same time. Additionally, each individual step may include additional steps without departing from the scope of the present disclosure.

To provide illustrations of one or more embodiments of the present disclosure, the following examples are provided.

An example system for detecting mud pulses may include a distributed acoustic sensing (DAS) data collection system coupled to a downhole drilling system, and an information handling system communicably coupled to the DAS data collection system. The information handling system may include a processor and memory coupled to the processor. The memory may contain a set of instructions that, when executed by the processor, cause the processor to receive quadrature DAS data signals from the DAS data collection system, determine a first template signal associated with mud pulses, transform the determined first template signal into analytic representation form, perform a matched filter operation using the quadrature DAS data signals and the transformed first template signal, and analyze an output signal of the matched filter operation to detect mud pulses in the downhole drilling system.

In one or more embodiments described in the preceding paragraph, the set of instructions that cause the processor to perform the first matched filter operation further cause the processor to perform a cross-correlation operation.

In one or more embodiments described in the preceding two paragraphs, the set of instructions that cause the processor to analyze the output signal of the first matched filter operation to identify the presence of mud pulses in the downhole drilling system further cause the processor to apply a threshold to the output signal of the first matched filter operation.

In one or more embodiments described in the preceding three paragraphs, the set of instructions that cause the processor to analyze the output signal of the first matched filter operation to identify the presence of mud pulses in the downhole drilling system further cause the processor to determine maxima in the output of the first matched filter operation.

In one or more embodiments described in the preceding four paragraphs, the set of instructions that cause the processor to transform the determined first template signal into analytic representation form further cause the processor to perform a Hilbert transform on the first template signal.

In one or more embodiments described in the preceding five paragraphs, the first template signal comprises a decaying sinusoidal signal.

In one or more embodiments described in the preceding six paragraphs, the set of instructions that cause the processor to determine the first template signal further cause the processor to determine the first template signal using an iterative estimation.

In one or more embodiments described in the preceding seven paragraphs, the set of instructions that cause the processor to determine the first template signal further cause the processor to select the first template signal from a database of signals.

In one or more embodiments described in the preceding eight paragraphs, the first matched filter operation is associated with a first channel of the DAS data collection system, and the set of instructions that further cause the processor to perform a second matched filter operation using the quadrature DAS data signals and the transformed first template signal, the second matched filter operation being associated with a second channel of the DAS data collection system, cross-correlate the output of the first matched filter operation and an output of the second matched filter operation, and determine, using an output of the cross-correlation, a mud flow velocity in the downhole drilling system.

In one or more embodiments described in the preceding nine paragraphs, the DAS data collection system is coupled to a mud pump of the downhole drilling system, and set of instructions further cause the processor to determine a second template signal associated with mud pump stroke pulses, transform the determined second template signal into analytic representation form, perform a second matched filter operation using the quadrature DAS data signals and the transformed second template signal, and detect mud pump stroke pulses in the downhole drilling system using an output of the second matched filter operation.

An example method comprises receiving quadrature DAS data signals from a DAS data collection system coupled to a downhole drilling system, determining a first template signal associated with mud pulses, transforming the determined first template signal into analytic representation form, performing a first matched filter operation using the quadrature DAS data signals and the transformed first template signal, and analyzing an output signal of the first matched filter operation to detect mud pulses in the downhole drilling system.

In one or more embodiments described in the preceding paragraph, performing the first matched filter operation comprises performing a cross-correlation operation.

In one or more embodiments described in the preceding two paragraphs, analyzing an output signal of the first matched filter operation to detect mud pulses in the downhole drilling system comprises applying a threshold to the output of the first matched filter operation.

In one or more embodiments described in the preceding three paragraphs, analyzing an output signal of the first matched filter operation to detect mud pulses in the downhole drilling system comprises determining maxima in the output of the first matched filter operation.

In one or more embodiments described in the preceding four paragraphs, transforming the determined first template signal into analytic representation form comprises performing a Hilbert transform on the first template signal.

In one or more embodiments described in the preceding five paragraphs, the first template signal comprises a decaying sinusoidal signal.

In one or more embodiments described in the preceding six paragraphs, determining the first template signal comprises performing an iterative estimation.

In one or more embodiments described in the preceding seven paragraphs, determining the first template signal comprises selecting the first template signal from a database of signals.

In one or more embodiments described in the preceding eight paragraphs, the first matched filter operation is associated with a first channel of the DAS data collection system, and the method further comprises performing a second matched filter operation using the quadrature DAS data signals and the transformed first template signal, the second matched filter operation being associated with a second channel of the DAS data collection system, cross-correlating the output of the first matched filter operation and an output of the second matched filter operation, and determining, using an output of the cross-correlation, a mud flow velocity in the downhole drilling system.

In one or more embodiments described in the preceding nine paragraphs, the method further comprises determining a second template signal associated with mud pump stroke pulses, transforming the determined second template signal into analytic representation form, performing a second matched filter operation using the quadrature DAS data signals and the transformed second template signal, and detecting mud pump stroke pulses in the downhole drilling system using an output of the second matched filter operation.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The present disclosure is therefore well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A system, comprising:
   a distributed acoustic sensing (DAS) data collection system coupled to a downhole drilling system; and
   an information handling system communicably coupled to the DAS data collection system, the information handling system comprising a processor and a memory device coupled to the processor, the memory device containing a set of instructions that, when executed by the processor, cause the processor to:
      receive quadrature DAS data signals from the DAS data collection system;
      determine a first template signal associated with mud pulses;
      transform the determined first template signal into analytic representation form;
      perform a first matched filter operation using the quadrature DAS data signals and the transformed first template signal; and
      analyze an output signal of the first matched filter operation to identify the presence of mud pulses in the downhole drilling system.

2. The system of claim 1, wherein the set of instructions that cause the processor to perform the first matched filter operation using the quadrature DAS data signals and the transformed first template signal further cause the processor to perform a cross-correlation operation.

3. The system of claim 1, wherein the set of instructions that cause the processor to analyze the output signal of the first matched filter operation to identify the presence of mud pulses in the downhole drilling system further cause the processor to apply a threshold to the output signal of the first matched filter operation.

4. The system of claim 1, wherein the set of instructions that cause the processor analyze the output signal of the first matched filter operation to identify the presence of mud pulses in the downhole drilling system further cause the processor to determine maxima in the output signal of the first matched filter operation.

5. The system of claim 1, wherein the set of instructions that cause the processor to transform the determined first template signal into analytic representation form further cause the processor to perform a Hilbert transform on the first template signal.

6. The system of claim 1, wherein the first template signal comprises a decaying sinusoidal signal.

7. The system of claim 1, wherein the set of instructions that cause the processor to determine the first template signal further cause the processor to determine the first template signal using an iterative estimation.

8. The system of claim 1, wherein the set of instructions that cause the processor to determine the first template signal further cause the processor to select the first template signal from a database of signals.

9. The system of claim 1, wherein the first matched filter operation is associated with a first channel of the DAS data collection system, and wherein the set of instructions further cause the processor to
   perform a second matched filter operation using the quadrature DAS data signals and the transformed first template signal, the second matched filter operation being associated with a second channel of the DAS data collection system;
   cross-correlate the output of the first matched filter operation and an output of the second matched filter operation; and
   determine, using an output of the cross-correlation, a mud flow velocity in the downhole drilling system.

10. The system of claim 1, wherein the DAS data collection system is coupled to a mud pump of the downhole drilling system, and wherein the set of instructions further cause the processor to:
    determine a second template signal associated with mud pump stroke pulses;
    transform the determined second template signal into analytic representation form;
    perform a second matched filter operation using the quadrature DAS data signals and the transformed second template signal; and
    analyze an output signal of the second matched filter operation to identify the presence of mud pump stroke pulses in the downhole drilling system.

11. A method for detecting mud pulses, comprising:
    transmitting one or more mud pulses in drilling mud circulating through a downhole drilling system;
    receiving quadrature DAS data signals from a DAS data collection system coupled to the downhole drilling system;
    determining a first template signal associated with the one or more mud pulses;
    transforming the determined first template signal into analytic representation form;
    performing a first matched filter operation using the quadrature DAS data signals and the transformed first template signal; and
    analyzing an output signal of the first matched filter operation to identify the presence of mud pulses in the downhole drilling system.

12. The method of claim 11, wherein performing the first matched filter operation comprises performing a cross-correlation operation.

13. The method of claim 11, wherein analyzing the output signal of the first matched filter operation to identify the presence of mud pulses in the downhole drilling system comprises applying a threshold to the output signal of the first matched filter operation.

14. The method of claim 11, wherein analyzing the output signal of the first matched filter operation to identify the presence of mud pulses in the downhole drilling system comprises determining maxima in the output signal of the first matched filter operation.

15. The method of claim 11, wherein transforming the determined first template signal into analytic representation form comprises performing a Hilbert transform on the first template signal.

16. The method of claim 11, wherein the first template signal comprises a decaying sinusoidal signal.

17. The method of claim 11, wherein determining the first template signal comprises performing an iterative estimation.

18. The method of claim 11, wherein determining the first template signal comprises selecting the first template signal from a database of signals.

19. The method of claim 11, wherein the first matched filter operation is associated with a first channel of the DAS data collection system, and the method further comprises performing a second matched filter operation using the quadrature DAS data signals and the transformed first template signal, the second matched filter operation being associated with a second channel of the DAS data collection system;

cross-correlating the output of the first matched filter operation and an output of the second matched filter operation; and determining, using an output of the cross-correlation, a mud flow velocity in the downhole drilling system.

20. The method of claim 11, further comprising:

determining a second template signal associated with mud pump stroke pulses;

transforming the determined second template signal into analytic representation form;

perform a second matched filter operation using the quadrature DAS data signals and the transformed second template signal; and analyzing the output signal of the second matched filer operation to identify the presence of mud pump stroke pulses in the downhole drilling system.

* * * * *